US007869386B2

(12) United States Patent
Shaffer et al.

(10) Patent No.: US 7,869,386 B2
(45) Date of Patent: Jan. 11, 2011

(54) METHOD AND SYSTEM FOR CONVEYING MEDIA SOURCE LOCATION INFORMATION

(75) Inventors: Shmuel Shaffer, Palo Alto, CA (US); Douglas J. Hall, Westerville, OH (US)

(73) Assignee: Cisco Technology, Inc., San Jose, CA (US)

( * ) Notice: Subject to any disclaimer, the term of this patent is extended or adjusted under 35 U.S.C. 154(b) by 551 days.

(21) Appl. No.: 11/214,582

(22) Filed: Aug. 29, 2005

(65) Prior Publication Data

US 2007/0047479 A1   Mar. 1, 2007

(51) Int. Cl.
*H04L 12/16* (2006.01)

(52) U.S. Cl. ............... 370/260; 370/266; 370/328; 455/456.1; 455/456.3; 379/202.01; 379/420.01

(58) Field of Classification Search ............ 455/518, 455/517, 519, 456.1, 456.3; 370/260, 266, 370/328; 379/202.01, 420.01
See application file for complete search history.

(56) References Cited

U.S. PATENT DOCUMENTS

| 4,359,603 | A | | 11/1982 | Heaton ................... 370/267 |
| 4,730,306 | A | | 3/1988 | Uchida ................... 370/263 |
| 4,746,924 | A | * | 5/1988 | Lightfoot ................ 342/453 |
| 5,048,082 | A | | 9/1991 | Krafft et al. ............. 379/389 |
| 5,099,510 | A | | 3/1992 | Blinken et al. ......... 379/202.01 |
| 5,436,896 | A | | 7/1995 | Anderson et al. ........ 370/260 |
| 5,539,741 | A | | 7/1996 | Barraclough et al. ..... 370/267 |
| 5,625,407 | A | | 4/1997 | Biggs et al. ............. 348/14.11 |
| 6,011,851 | A | | 1/2000 | O'Connor et al. ........ 381/17 |
| 6,094,578 | A | | 7/2000 | Purcell et al. ........... 455/426 |
| 6,178,237 | B1 | | 1/2001 | Horn ................... 379/202.01 |
| 6,185,205 | B1 | | 2/2001 | Sharrit et al. ........... 370/389 |
| 6,204,844 | B1 | | 3/2001 | Fumarolo et al. ........ 345/329 |
| 6,233,315 | B1 | | 5/2001 | Reformato et al. ....... 379/88.01 |
| 6,327,567 | B1 | | 12/2001 | Willehadson et al. ..... 704/270 |
| 6,374,100 | B1 | | 4/2002 | Smith et al. ............. 455/419 |
| 6,400,816 | B1 | | 6/2002 | Hjalmtysson et al. ... 379/201.03 |

(Continued)

FOREIGN PATENT DOCUMENTS

WO      WO 01/91485 A1   11/2001

(Continued)

OTHER PUBLICATIONS

PCT Notification of Transmittal of the International Search Report and the Written Opinioin of the International Searching Authority, or the Declaration in International Application No. PCT/US06/30294, dated Apr. 9, 2007, 10 pages.

(Continued)

*Primary Examiner*—Ajit Patel
*Assistant Examiner*—Khai M Nguyen
(74) *Attorney, Agent, or Firm*—Baker Botts L.L.P.

(57) ABSTRACT

A method for conveying media source location information includes receiving a first communication from a first endpoint and receiving location information indicating a first location of the first endpoint. The method also includes presenting the first communication to a user of a second endpoint in a manner to reflect the first location relative to a second location of the second endpoint.

32 Claims, 3 Drawing Sheets

U.S. PATENT DOCUMENTS

| | | | |
|---|---|---|---|
| 6,404,873 B1 | 6/2002 | Beyda et al. | 379/202.01 |
| 6,408,327 B1 | 6/2002 | McClennon et al. | 709/204 |
| 6,418,214 B1 | 7/2002 | Smythe et al. | 379/202.01 |
| 6,453,022 B1 | 9/2002 | Weinman, Jr. | 379/88.13 |
| 6,501,739 B1 | 12/2002 | Cohen | 370/260 |
| 6,608,820 B1 | 8/2003 | Bradshaw | 370/260 |
| 6,792,092 B1 | 9/2004 | Michalewicz | 379/202 |
| 6,850,496 B1* | 2/2005 | Knappe et al. | 370/260 |
| 6,873,854 B2 | 3/2005 | Crockett et al. | 455/518 |
| 6,882,856 B1 | 4/2005 | Alterman et al. | 455/519 |
| 6,885,874 B2 | 4/2005 | Grube et al. | 455/520 |
| 6,912,389 B2 | 6/2005 | Bright et al. | 455/433 |
| 6,982,961 B2 | 1/2006 | Refai et al. | 370/265 |
| 6,987,480 B1 | 1/2006 | Kotick et al. | 342/41 |
| 6,987,841 B1 | 1/2006 | Byers et al. | 379/88.17 |
| 6,993,120 B2 | 1/2006 | Brown et al. | 379/88.13 |
| 6,996,406 B2 | 2/2006 | Lection et al. | 455/457 |
| 6,999,782 B2 | 2/2006 | Shaughnessy et al. | 455/518 |
| 6,999,783 B2 | 2/2006 | Toyryla et al. | 455/519 |
| 7,003,286 B2 | 2/2006 | Brown et al. | 455/416 |
| 7,006,607 B2 | 2/2006 | Garcia | 379/88.18 |
| 7,010,106 B2 | 3/2006 | Gritzer et al. | 379/202.01 |
| 7,010,109 B2 | 3/2006 | Gritzer et al. | 379/202.01 |
| 7,010,275 B2 | 3/2006 | Davies | 455/90.2 |
| 7,013,279 B1 | 3/2006 | Nelson | 704/270 |
| 7,031,700 B1* | 4/2006 | Weaver et al. | 455/420 |
| 7,035,385 B2 | 4/2006 | Levine et al. | 379/88.23 |
| 7,058,168 B1 | 6/2006 | Knappe et al. | 379/204.01 |
| 7,079,857 B2 | 7/2006 | Maggenti et al. | 455/518 |
| 2001/0028321 A1 | 10/2001 | Krasner | 342/357.1 |
| 2002/0013813 A1 | 1/2002 | Matsuoka | 709/204 |
| 2002/0118796 A1 | 8/2002 | Menard et al. | 379/45 |
| 2002/0152305 A1 | 10/2002 | Jackson et al. | 709/224 |
| 2002/0178364 A1 | 11/2002 | Weiss | 713/182 |
| 2003/0100326 A1 | 5/2003 | Grube et al. | 455/515 |
| 2004/0054428 A1 | 3/2004 | Sheha et al. | 700/56 |
| 2004/0070515 A1 | 4/2004 | Burkley et al. | 340/825.49 |
| 2004/0139320 A1 | 7/2004 | Shinohara | 713/168 |
| 2004/0160458 A1 | 8/2004 | Igarashi et al. | 345/660 |
| 2004/0185863 A1 | 9/2004 | Ogami | 455/452.1 |
| 2004/0192353 A1 | 9/2004 | Mason et al. | 455/457 |
| 2004/0249949 A1 | 12/2004 | Gourraud et al. | 709/227 |
| 2005/0048987 A1* | 3/2005 | Glass | 455/456.1 |
| 2005/0135348 A1 | 6/2005 | Staack | 370/353 |
| 2005/0174991 A1 | 8/2005 | Keagy | 370/352 |
| 2005/0195774 A1 | 9/2005 | Chennikara et al. | 370/338 |
| 2005/0213739 A1* | 9/2005 | Rodman et al. | 379/202.01 |
| 2005/0232207 A1 | 10/2005 | Antoniadis et al. | 370/338 |
| 2005/0265256 A1 | 12/2005 | Delaney | 370/254 |
| 2006/0114847 A1 | 6/2006 | Dssouli et al. | 370/261 |
| 2006/0118636 A1 | 6/2006 | Miles et al. | 235/472 |
| 2006/0165060 A1 | 7/2006 | Dua | 370/352 |
| 2007/0030144 A1 | 2/2007 | Titus et al. | 340/534 |
| 2007/0047479 A1 | 3/2007 | Shaffer et al. | 370/328 |
| 2007/0060144 A1 | 3/2007 | Mills et al. | 455/445 |
| 2007/0104121 A1 | 5/2007 | Shaffer et al. | 370/276 |
| 2007/0105578 A1 | 5/2007 | Shaffer et al. | 455/518 |
| 2007/0105579 A1 | 5/2007 | Shaffer et al. | 455/519 |
| 2007/0115848 A1 | 5/2007 | Chean et al. | 370/252 |
| 2007/0274611 A1* | 11/2007 | Rodriguez et al. | 382/317 |
| 2008/0037461 A1 | 2/2008 | Biltz et al. | 370/328 |
| 2008/0167049 A1 | 7/2008 | Karr et al. | 455/456 |

FOREIGN PATENT DOCUMENTS

| | | |
|---|---|---|
| WO | WO 02/074051 A2 | 9/2002 |

OTHER PUBLICATIONS

PCT International Search Report and Written Opinion (ISA/US) for PCT/US06/19227; 7 pages, Sep. 4, 2007.

NetworkFirst Interoperability Solved, Data Sheet, M/A-COM, Inc., ECR-7018A, http://www.networkfirst.com/resources/pdf/NetworkFirstRevised5_03.pdf, 6 pages, May 2003.

Network Solution:, Information Sheet, NetworkFirst, M/A-COM, Inc., http://www.networkfirst.com/features/solution, 2 pages, 2003.

ACU-1000™ Interoperability NOW™, Information Sheet, Raytheon JPS Communications, http://www.jps.com/downloads/PDFS/acuupgrade.pdf, 4 pages, Mar. 2004.

Interoperability Gateway, OpenSky, NetworkFirst, P25$^{IP}$, Data Sheet, M/A-COM, Inc. ECR-7054, http://www.opensky.com/network/7054.pdf, 2 pages, May 2003.

C3 Maestro$^{IP}$ Dispatch Console, OpenSky, NetworkFirst, P25$^{IP}$, Data Sheet, M/A-COM, Inc. ECR-7160A, http://www.opensky.com/network/7160.pdf, 2 pages, Oct. 2003.

V$^{IP}$ Dispatch Console, OpenSky, NetworkFirst, P25$^{IP}$, Data Sheet, M/A-COM, Inc. ECR-7241B, http://www.opensky.com/network/7241B.pdf, 2 pages, Oct. 2004.

Cisco IP Interoperability and Collaboration System, Q&A, Copyright © Cisco Systems, Inc. www.cisco.com, 4 pages, Oct. 2005.

Cisco IPICS, Solution Overview, Copyright © Cisco Systems, Inc., www.cisco.com/go/ipics, 6 pages, Oct. 2005.

MRT Urgent Communications: Service, Safety, Security, M/A-Com Emphasizes Power of IP in Seven Announcements at APCO, Aug. 18, 2002, 6 pages. http://mrtmag.com/products/new/radio_macom_emphasizes_power, Aug. 18, 2002.

Jim McKay, *Government Technology*, "Intact Amid Chaos", Mar. 2005, 2 pages.

Ian Hoffman, *Oakland Tribune*, "Oakland's New Radios Pass Test, City, Regional Agencies Get Green Light to Buy Public-Safety Equipment," 2007, 2 pages (reprinted by Tyco Electronics and available at http://www.macom-wireless.com/news/oaklands%20new%20radios.asp), Mar. 11, 2005.

MRT Urgent Communications: Service, Safety, Security, "5 for '05 Technologies," Dec. 1, 2004, 9 pages. http://mrtmag.com/mag/radio_technologies.

MRT Urgent Communications: Service, Safety, Security, John Facella, "ROIP Success Is in the Details," Dec. 1, 2004, 3 pages. http://mrtmag.com/mag/radio_roip_success_details/.

Ann Imse, *Rocky Mountain News*, "Radio Breakthrough for Cops, Firefighters," Dec. 10, 2004, 2 pgs.

*First Responder Communications*, A Supplement to MRT and Fire Chief, "IP Opens Eyes," Aug. 2004, 5 pages.

*MRT, Mobile Radio Technology*, "IP Evangelist," Apr. 2004, 4 pages, www.iwce-mrt.com.

Ron Bender, et al., *MRT; Mobile Radio Technology* "Multiple Choices for Critical Communications," Oct. 2001, 4 pages, www.mrtmag.com.

Jay Herther, et al., *MRT; Mobile Radio Technology*, "Voice-over-Interintranet Protocol for Critical Communications," Aug. 2001, 4 pages, www.mrtmag.com.

*What's New in Radio Communications*, Aug./Sep. 2001, vol. 14 No. 1, Inside: Marine Radio, 2 pages, www.westwick-farrow.com.au, Aug. 9, 2001.

Rivero-Angeles, Mario et al., *Random-Access Control Mechanism Using Adaptive Traffic Load in ALOHA and CSMA Strategies for EDGE*, May 2005, IEEE Transactions on Vehicular Technology, Vo. 54, No. 3, 2 (1161) May 2005.

Shaffer et al., U.S. Appl. No. 11/149,041, filed Jun. 11, 2005, Communication from the U.S. Patent and Trademark Office mailed Sep. 14, 2006.

Shaffer et al., U.S. Appl. No. 11/149,041, filed Jun. 11, 2005, Communication from the U.S. Patent and Trademark Office mailed Mar. 12, 2007.

Shaffer et al., U.S. Appl. No. 11/149,041, filed Jun. 11, 2005, Communication from the U.S. Patent and Trademark Office mailed Jan. 24, 2008.

Shaffer et al., U.S. Appl. No. 11/149,041, filed Jun. 11, 20051, Communication from the U.S. Patent and Trademark Office mailed Jul. 30, 2008.

Shaffer et al., U.S. Appl. No. 11/149,041, filed Jun. 11, 2005, Communication from the U.S. Patent and Trademark Office mailed Jan. 8, 2009.

Shaffer et al., U.S. Appl. No. 11/201,832, filed Aug. 10, 2005, Communication from the U.S. Patent and Trademark Office mailed Sep. 28, 2007.
Shaffer et al., U.S. Appl. No. 11/201,832, filed Aug. 10, 2005, Communication from the U.S. Patent and Trademark Office mailed Apr. 1, 2008.
Shaffer et al., U.S. Appl. No. 11/202,400, filed Aug. 10, 2005, Communication from the U.S. Patent and Trademark Office mailed Jul. 31, 2007.
Shaffer et al., U.S. Appl. No. 11/202,400, filed Aug. 10, 2005, Communication from the U.S. Patent and Trademark Office mailed Apr. 25, 2008.
Shaffer et al., U.S. Appl. No. 11/202,400, filed Aug. 10, 2005, Communication from the U.S. Patent and Trademark Office mailed Mar. 9, 2009.
Shaffer et al., U.S. Appl. No. 11/202,403, filed Aug. 10, 2005, Communication from the U.S. Patent and Trademark Office mailed Sep. 28, 2007.
Shaffer et al., U.S. Appl. No. 11/202,403, filed Aug. 10, 2005, Communication from the U.S. Patent and Trademark Office mailed Apr. 1, 2008.
Shaffer et al., U.S. Appl. No. 11/365,113, filed Feb. 28, 2006, Communication from the U.S. Patent and Trademark Office mailed Feb. 3, 2009.
Shaffer et al., U.S. Appl. No. 11/365,113, filed Feb. 28, 2006, Communication from the U.S. Patent and Trademark Office mailed Jan. 21, 2010.
Shaffer et al., U.S. Appl. No. 11/149,041, filed Jun. 8, 2005, Communication from the U.S. Patent and Trademark Office mailed Feb. 25, 2010.
Shaffer et al., U.S. Appl. No. 11/365,113, filed Feb. 28, 2006, Communication from the U.S. Patent and Trademark Office mailed Jul. 29, 2009.
U.S. Appl. No. 09/751,799 entitled, "*Method and System for Participant Control of Privacy During Multiparty Communication Sessions,*" 40 pages specification, claims and abstract, 5 pages of drawings, inventors Knappe, et al., Dec. 29, 2000.
Matthews, et al., *A New Interoperability Paradigm A Concept Proposal*, Mar. 2006, Worcester Polytechnic Institute, WPI Bioengineering Institute, 15 pages.
PCT Notification of Transmittal of the International Search Report and the Written Opinion of the International Searching Authority, or the Declaration, mailed Feb. 27, 2007, corresponding to PCT/US06/30447 filed Aug. 3, 2006 (20 pages).
Shaffer, et al., U.S. Appl. No. 11/364,146, filed Feb. 27, 2006, *Method and System for Providing Interoperable Communication with Congestion Management*, .

Shaffer, et al., U.S. Appl. No. 11/365,113, filed Feb. 28, 2006, *Method and System for Providing Interoperable Communication with Dynamic Event Area Allocation*, .
Shaffer, et al., U.S. Appl. No. 11/399,031, filed Apr. 5, 2006, *Method and System for Managing Virtual Talk Groups*, .
Shaffer, et al., U.S. Appl. No. 11/382,496, filed May 10, 2006, *Providing Multiple Virtual Talk Group Communication Sessions*, Mar. 10, 2006.
Kalley, et al., U.S. Appl. No. 11/383,998, filed May 18, 2006, *Providing Virtual Talk Group Communication Sessions in Accordance with Endpoint Resources*, .
Shaffer, et al., U.S. Appl. No. 11/421,994, filed Jun. 2, 2006, *Method and System for Joining a Virtual Talk Group*, .
Shaffer, et al., U.S. Appl. No. 11/421,999, filed Jun. 2, 2006, *Method and System for Managing a Plurality of Virtual Talk Groups*.
Shaffer, et al., U.S. Appl. No. 11/617,019, filed Dec. 28, 2006, *Method and System for Providing Congestion Management within a Virtual Talk Group*, .
Shaffer, et al., U.S. Appl. No. 11/746,960, filed May 10, 2007, *Method and System for Handling Dynamic Incidents*, .
Shaffer, et al., U.S. Appl. No. 11/550,234, filed Oct. 17, 2006, *Method and System for Providing an Indication of a Communication*, .
J. Polk, et al., Dynamic Host Configuration Protocol Option for Coordinate-based Location Configuration Information, Network Working Group, Internet RFC 3825, Category: Standards Track, The Internet Society, 15 pages, Jul. 2004.
OnStar Technology, Information Sheet, OnStar Corp., http://www.onstar.com/us_english/jsp/explore/onstar_basics/technology.jsp, 3 pages, 2005.
U.S. Appl. No. 11/149,041 entitled, "*Method and System for Communicating Using Position Information*", 39 pages specification, claims and abstract, 3 pages of drawings, inventors Shmuel (nmi) Shaffer, et al., Jun. 8, 2005.
U.S. Appl. No. 11/201,832, entitled, "*Method and System for Automatic Configuration of Virtual Talk Groups Based on Location of Media Source*", 65 pages specification, claims and abstract, 6 pages of drawings, inventors Shmuel (nmi) Shaffer, et al., Aug. 10, 2005.
U.S. Appl. No. 11/202,400, entitled, "*Method and System for Communicating Media Based on Location of Media Source*", 66 pages specification, claims and abstract, 6 pages of drawings, inventors Shmuel (nmi) Shaffer, et al., Aug. 10, 2005.
U.S. Appl. No. 11/202,403, entitled, "*Method and System for Providing Interoperable Communications With Location Information*", 66 pages specification, claims and abstract, 6 pages of drawings, inventors Shmuel (nmi) Shaffer, et al., Aug. 10, 2005.

* cited by examiner

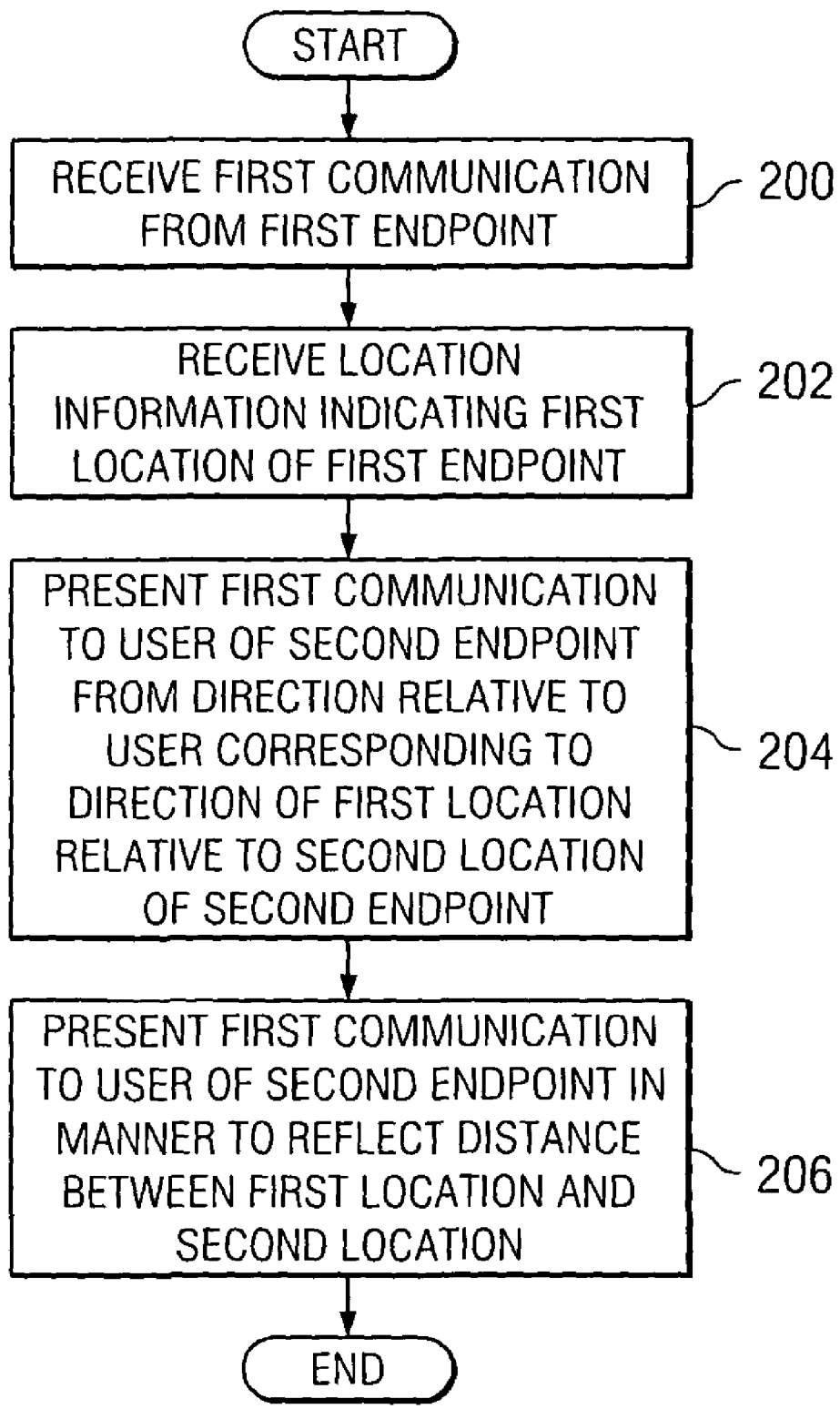

METHOD AND SYSTEM FOR CONVEYING MEDIA SOURCE LOCATION INFORMATION

TECHNICAL FIELD OF THE INVENTION

This invention relates in general to communication systems and, more particularly, to a method and system for conveying media source location information.

BACKGROUND OF THE INVENTION

Many public and private groups, such as security and safety personnel (e.g., police, fire fighters and ambulance drivers) use various communication networks of differing technologies and types for communication. Many networks utilize land mobile radios communicating through push-to-talk technologies. However, communications among different endpoints of different networks such as endpoints of different police, fire or other security networks may be difficult. Collaboration between the different agencies and networks tends to be ad hoc and inefficient. When achieved, it often involves laborious manual intervention. Organizations working towards interoperability solutions include Raytheon JPS Communications, IP Blue, Twisted Pair, M/A-COM and Cisco Systems.

In some systems, dispatchers divide various voice channels into two groups and direct their voice systems to deliver more important channels to their, for example, right ear while the other less important channels are directed to their left ear. Some systems allow users and dispatchers to present voice streams from any desired fixed direction.

U.S. Pat. No. 5,048,082, entitled "Voice direction recognition in a digital telephone station" describes a method for controlling a voice-controlled voice direction recognition unit for a digital telephone. It allows users to alter the direction of arrival of their voice by manipulating the attenuation of the signals to the headset. Some conferencing systems divide conferencing presentation sound fields into sectors and allocate one or more sectors to each conferencing endpoint. These systems allow a conference participant to increase his comprehension when multiple participants are speaking simultaneously, as well as to alleviate confusion as to who is speaking at any given time. Some methods convey GPS information of speakers to listeners and facilitate a presentation of an icon on a map that identifies the location of a speaker.

SUMMARY OF THE INVENTION

The present invention provides a method and system for conveying media source location information that substantially eliminates or reduces at least some of the disadvantages and problems associated with previous methods and systems.

In accordance with a particular embodiment, a method for conveying media source location information includes receiving a first communication from a first endpoint and receiving location information indicating a first location of the first endpoint. The method also includes presenting the first communication to a user of a second endpoint in a manner to reflect the first location relative to a second location of the second endpoint.

Presenting the first communication to a user of a second endpoint in a manner to reflect the first location relative to a second location of the second endpoint may comprise presenting the first communication to the user from a direction relative to the user corresponding to a direction of the first location relative to the second location. The method may comprise receiving orientation information indicating an orientation of the user. The method may also comprise presenting the first communication to the user from a direction relative to the user corresponding to a direction of the first location relative to the second location. Presenting the first communication to a user of a second endpoint in a manner to reflect the first location relative to a second location of the second endpoint may comprise presenting the first communication to the user in a manner to reflect a distance between the first location and the second location. Presenting the first communication to a user of a second endpoint in a manner to reflect the first location relative to a second location of the second endpoint may comprise attenuating an output signal of at least one speaker of a plurality of speakers used to present the first communication to the user of the second endpoint. The first communication may comprise an audio message and the location information may be steganographically embedded within the audio message. The first endpoint may comprise a push-to-talk endpoint, and the first communication may comprise a push-to-talk communication.

In accordance with another embodiment, a system for conveying media source location information includes an interface operable to receive a first communication from a first endpoint and receive location information indicating a first location of the first endpoint. The system also includes a processor coupled to the interface and operable to present the first communication to a user of a second endpoint in a manner to reflect the first location relative to a second location of the second endpoint.

Technical advantages of particular embodiments include the ability to render a communication stream, such as a voice stream, to an end user from the real direction of the speaker relative to the end user. Particular embodiments also provide the listener with an indication about the distance of the speaker from the listener by, for example, altering the volume of the rendered audio. Media streams carrying location information to facilitate the conveyance of relative locations of transmitting endpoints may be integrated with those that do not have associated location information. For example, a distinct audible tone may be provided to mark media streams for which the direction of arrival is unknown.

Other technical advantages will be readily apparent to one skilled in the art from the following figures, descriptions and claims. Moreover, while specific advantages have been enumerated above, various embodiments may include all, some or none of the enumerated advantages.

BRIEF DESCRIPTION OF THE DRAWINGS

For a more complete understanding of the present invention and its advantages, reference is now made to the following description, taken in conjunction with the accompanying drawings, in which:

FIG. 5 illustrates a method for conveying media source location information, in accordance with a particular embodiment.

DETAILED DESCRIPTION OF EXAMPLE EMBODIMENTS

Figure 1:
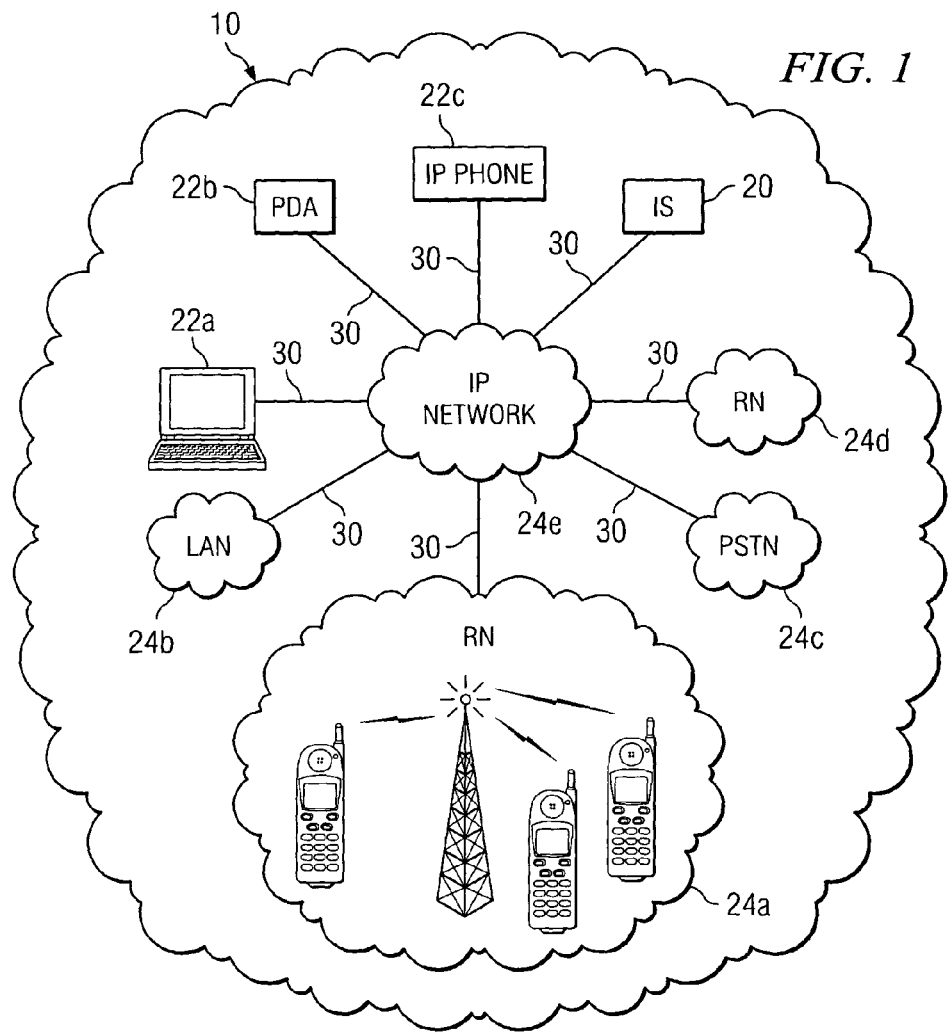
FIG. 1 illustrates a communication system with various communication networks and an interoperability system, in accordance with a particular embodiment.

FIG. 1 illustrates a communication system 10, in accordance with a particular embodiment. Communication system 10 includes communication networks 24a-24e, interoperability system (IS) 20 and endpoints 22a-22c. IS 20 is able to facilitate interoperable communication sessions between and among various communication devices, such as endpoints of communication networks 24 and endpoints 22. IS 20 uses a systems approach to offer a framework based on IP protocols and services to immediately achieve secure voice, video and other data interoperability among communication endpoints and networks utilizing different technologies.

In some communication systems, such as communication systems for push to talk (PTT) and other media (e.g., communication system 10), the direction of a speaker relative to a recipient of a particular communication may convey critical information. For example, when SWAT team members talk with each other, the relative position of each member may provide critical information to the other team members. In this environment, when a team member calls for help or spots a target, it may be critical for the other team members to obtain the relative direction of the speaker. In another scenario, a fire fighter may need help and may find it difficult to describe his location because of smoke. As another example, when soldiers ride in closed vehicles and communicate via PTT devices, it may be critical for them to convey to their battalion members not only what they see through their limited field of view but also where they are positioned in the battlefield.

Particular embodiments enable team members to determine relative locations of speakers thus facilitating communications and updates about a situation or event in their specific areas of operation. Using systems and functionality described herein that can present media streams as if arriving from any particular direction, particular embodiments convey communicated media in a manner to reflect a location of the communication's transmitting endpoint.

In particular embodiments, IS 20 has the ability to communicate transmitted media to users in a manner to indicate the location of the source of the transmitted media relative to the position and orientation of the recipient(s). For example, if a transmitting endpoint is to the left of a recipient of a communication, then the communication may be presented to the recipient as if coming from the recipient's left. The closer the transmitting endpoint, the louder the media may be communicated to the recipient. The manner in which the relative position of the transmitting endpoint is communicated may depend on the number, nature and position of speakers or other audio communication components used to transmit the media. While particular embodiments discuss an IS providing this functionality, other embodiments may provide this functionality without using an interoperability system. Various methods through which this functionality may be provided are further discussed below.

In the illustrated embodiment, communication networks 24a and 24d comprise radio networks (RNs), communication network 24b comprises a local area network (LAN), communication network 24c comprises a PSTN and communication network 24e comprises an IP network. It should be understood, however, that communication system 10 may comprise any number of IP or non-IP communication networks of any wireless or wireline form capable of communicating audio and/or video telecommunication signals, data, and/or messages, including signals, data or messages. Communication networks 24a-24e may include any number and combination of segments, nodes and endpoints to enable communication among network devices and components. Communication networks 24a-24e may be distributed locally or across multiple cities and geographic regions. Nodes may include any combination of network components, gatekeepers, call managers, conference bridges, routers, hubs, switches, gateways, base stations, endpoints or other hardware, software or embedded logic implementing any number of communication protocols that allow for the exchange of data in communication system 10. Segments 30, which may comprise any suitable wireless or wireline communication links, including one or more communication networks (e.g., WANs) as appropriate, couple various networks with each other and with endpoints 22 and IS 20. In particular embodiments, segments may include gateways for facilitating communication between various networks, such as an LMR gateway between radio network 24a and IP network 24e.

In some cases, users of endpoints of one of communication networks 24a-24e may communicate with endpoints of another one of communication networks 24a-24e through IS 20. A radio network, such as radio network 24a or 24d, may support communication among portable mobile station endpoints, such as land mobile radios (LMRS), using any suitable communication methods or features, such as cellular and push-to-talk (PTT). Communication networks 24a-24e may comprise networks of particular groups or agencies (e.g., a municipality's police department network), whether operational with respect to a particular area or otherwise.

IS 20 enables, facilitates and/or provides for interoperable communication among communication endpoints and devices, such as LMRs, cellular phones, IP phones, PCs, PDAs, PSTN phones, video monitors, cameras and sensors of one or more communication networks (e.g., communication networks 24a-24e) using Internet Protocol. Such endpoints may comprise IP or non-IP-enabled endpoints. In particular embodiments, IS 20 may control gateways (for example, of segments 30) in order to map radio frequencies of particular mobile radio endpoints to IP addresses for communication to other types of radio endpoints or IP devices. For example, a particular gateway may be able to receive communications from various types of endpoints (e.g., on various types of communication networks) and may convert such communications for transmission to other types of endpoints. IS 20's control of the gateway may control the various endpoints and/or networks that receive particular communications, depending on system functionality and configuration as further discussed below. As indicated, such control may include the mapping of communications and endpoints to IP addresses for interoperable communication. In some embodiments, IS 20 may host audio conferences that bridge communications received from endpoints. As indicated above, communication system 10 (including IS 20) may include any suitable number or type of gateways (e.g., LMR and PSTN gateways), servers (e.g., multipoint conference servers), switches, routers, firewalls, access points, processors, memory or other hardware, software or encoded logic to provide functionality described herein. IS 20 is coupled to communication networks 24a-24d and endpoints 22 through IP network 24e, which may comprise any suitable IP network.

As indicated above, IS 20 uses IP to enable communication among endpoints of various networks. The manner in which IS 20 facilitates communications among endpoints may vary according to location and system or operational needs. For example, IS 20 may communicate with endpoints using multicast IP addresses assigned to an endpoint of a communication network, a group of endpoints of a communication network or one or more endpoints of multiple communication networks or alternatively using a peer to peer dialed connection or a nailed dialed connection. A group of endpoints may be combined into a virtual talk group for communication using a particular IP address. As an example, the virtual talk group may be assigned a multicast IP address through which users of various endpoints may communicate on the talk group. The use of multicast IP addresses allows IS 20 to facilitate communications among communication devices and endpoints of various communication networks to provide audio, data, video and control network interoperability. As an additional example, in some cases multicast streams (e.g., utilizing multicast IP addresses) may be used. In some cases nailed dialed connections, such as those using SIP protocol, may be used for communication among endpoints and with IS 20. Various embodiments may combine communication methods to facilitate communication among endpoints. For example, in some cases certain endpoints of a virtual talk group may participate in the talk group through a multicast IP address while other endpoints may utilize a nailed SIP connection. IS 20 may control this participation, such as by controlling gateways, multipoint conferences and the mapping of communications to IP addresses.

IS 20 may be utilized and implemented in any number of market segments, such as enterprise safety and security (e.g., loss prevention), transportation, retail, public safety and federal agencies in order to provide radio and non-radio network interoperability within and between such market segments. As indicated above, such network interoperability includes the interoperability of push-to-talk voice technology within various networks and the interoperability between push-to-talk and full duplex dialed connections.

It will be recognized by those of ordinary skill in the art that endpoints 22 and IS 20 may be any combination of hardware, software and/or encoded logic that provides communication services to a user. In the illustrated embodiment, endpoints 22 comprise a PC (endpoint 22*a*), a PDA (endpoint 22*b*) and an IP phone 22*c*). However, in other embodiments, endpoints 22 may include a telephone, a personal computer (PC), a video monitor, a camera, an IP phone, a cell phone, a land mobile radio (LMR), a personal digital assistant (PDA), a command center or any other communication hardware, software and/or encoded logic that supports the communication of audio, video or other data, using packets of media (or frames) or otherwise, through communication system 10. Endpoints 22 as well as endpoints and components of communication networks 24 may be capable of communicating using any particular type of technology, such as cellular, IP, PSTN, CDMA, GSM, TDMA and satellite. Endpoints 22 and IS 20 may also include unattended or automated systems, gateways, other intermediate components or other devices that can establish media sessions.

Although the illustrated embodiment includes five communication networks 24*a*-24*e*, the term "communication network" should be interpreted as generally defining any network capable of transmitting audio and/or video telecommunication signals, data, and/or messages, including signals, data or messages. Any one of networks 24*a*-24*e* may be implemented as a local area network (LAN), wide area network (WAN), cellular network, global distributed network such as the Internet, Intranet, Extranet, PSTN, LMR network, CDMA network, GSM network, TDMA network, satellite network or any other form of wireless or wireline communication network.

Communications over communication networks 24*a*-24*e* may use any suitable communication protocol. In a particular embodiment, some communication networks may employ voice communication protocols that allow for the addressing or identification of endpoints, nodes, and/or other components coupled to the communication network. For example, using Internet protocol (IP), each of the components coupled together by, for example, communication network 24*b* in communication system 10 may be identified in information directed using IP addresses. In this manner, network 24*b* may support any form and/or combination of point-to-point, multicast, unicast, or other techniques for exchanging media packets among components in communication system 10. Any network components capable of exchanging audio, video, or other data are included within the scope of the present invention.

Since IP networks share a common method of transmitting data, telecommunication signals may be transmitted between telephony devices located on different, but interconnected, IP networks. In addition to being coupled to other IP networks, communication network 24*b* may also be coupled to non-IP telecommunication networks, for example through the use of interfaces or components, including gateways. In the illustrated embodiment, communication network 24*b* may be coupled with PSTN 24*c* through a gateway. In some embodiments the gateway may be a part of IS 20 or network 24*e*. PSTN 24*c* includes switching stations, central offices, mobile telephone switching offices, pager switching offices, remote terminals, and other related telecommunications equipment that are located throughout the world. IP networks transmit data (including voice and video data) by placing the data in packets and sending each packet individually to the selected destination, along one or more communication paths. Unlike a circuit-switched network (like PSTN 24*c*), a dedicated circuit is not required for the duration of a call or fax transmission over IP networks.

Technology that allows telecommunications to be transmitted over an IP network may comprise Voice over IP (VoIP), or simply Voice over Packet (VoP). In the illustrated embodiment, one or more of endpoints 22, and endpoints and components of communication networks 24 may be IP telephony devices capable of participating in IM, video, and other multimedia communication sessions. IP telephony devices have the ability of encapsulating a user's voice (or other input) into IP packets so that the voice can be transmitted over a communication network. IP telephony devices may include telephones, fax machines, computers running telephony software, nodes, gateways, wired or wireless devices, hand held PDAs, or any other device capable of performing telephony functions over an IP network.

In particular embodiments, communication system 10 may receive and transmit data in a session initiation protocol (SIP) environment. SIP is an application-layer control protocol that includes primitives for establishing, modifying and terminating communication sessions. SIP works independently of underlying transport protocols and without dependency on the type of session that is being established. SIP also transparently supports name mapping and redirection services, which support personal mobility.

Although FIG. 1 illustrates a particular number and configuration of endpoints, IS and communication networks, communication system 10 contemplates any number or arrangement of such components for communicating media.

Figure 2:
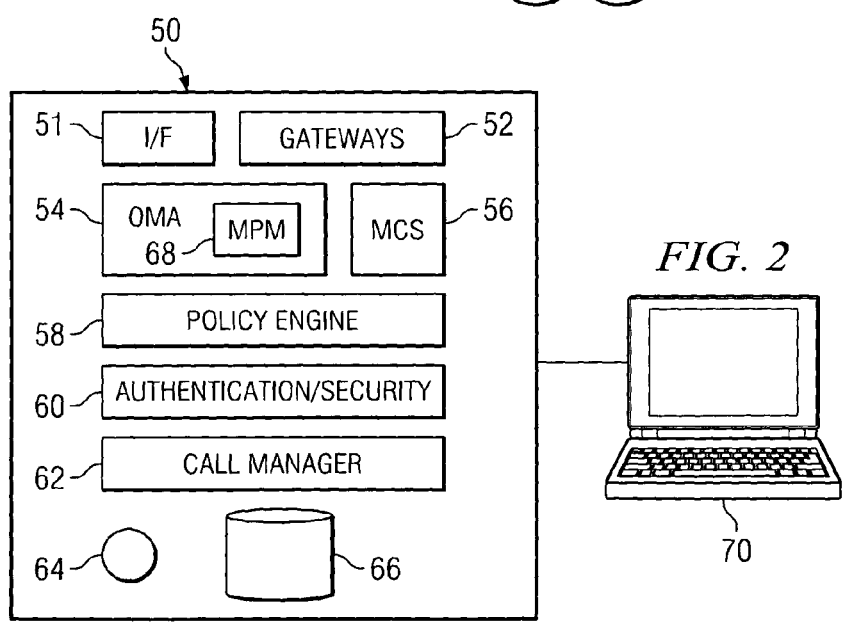
FIG. 2 illustrates an example interoperability system, in accordance with a particular embodiment.

FIG. 2 illustrates interoperability system (IS) 50, in accordance with a particular embodiment. IS 50 may be similar to and provide the same functionality as IS 20 of FIG. 1. In the illustrated embodiment, IS 50 includes interface 51, gateways 52, operations management application (OMA) 54, multipoint conference system (MCS) 56, policy engine 58, authentication and security system 60, call manager 62, processor 64 and memory module 66. IS 50 is coupled to a PC endpoint 70 that may be used to access, configure and control various functionality provided by IS 50. PC endpoint 70 may run a client application for such access, configuration and control. The client application may enable a user of endpoint 70 to receive and monitor communications from various endpoints and virtual talk groups and communicate with such endpoints and virtual talk groups as well (e.g., in a similar manner as dispatch personnel). In particular embodiments, other types of endpoints may be utilized to access, configure and control IS 50, such as IP phones, PDAs and other mobile endpoints. IS 50 may be coupled to such endpoints (including PC endpoint 70) through one or more communication networks.

Interface 51 is used in the communication of audio, video, signaling and other data between IS 50 and other network components. For example, interface 51 may receive communications from endpoints such as endpoints of communication networks 24, endpoints 22 and endpoint 70. The communication may take place over IP networks thereby negating the need for dedicated wiring between the endpoints and the IS.

Gateways 52 may include any suitable gateways to provide network interoperability and back-end legacy application integration, such as LMR gateways, PSTN gateways and application gateways. Gateways 52 provide mapping between IP services and the interoperable networks, such as LMR network 24a of FIG. 1. In some cases gateways 52 may not be located within an IS but may be distributed throughout a communication system for enabling communications among various communication networks.

Operations management application (OMA) 54 includes functionality for configuration, management and control of IS 50, including conference and collaboration management, and may be accessed by a user via, for example, PC endpoint 70. In particular embodiments, OMA 54 may enable a user, such as dispatch personnel or administrators or a mobile user (e.g., a first responder mobile user) accessing IS 50 via a mobile endpoint, the ability to configure, manage and participate in one or more virtual talk groups and ad hoc conferences simultaneously. In particular embodiments, OMA 54 may be accessed through a web interface, functioning for example as a soft phone or PTT device for radios. A screen display may be controlled using a mouse, keypad, touch screen, voice commands or any other suitable interface. OMA 54 screens may include any number of functional controls to provide interoperable communications. OMA 54 may authenticate a user and obtain user configuration information upon a user accessing the OMA. OMA 54 may monitor and provide communication ability for any number of channels at one time to provide the ability for an OMA user to communicate on and control multiple virtual talk groups at once.

Multipoint conference system (MCS) 56 provides collaboration and conference services for multiple endpoints of one or more networks. For example, users of multiple endpoints (such as LMRs of different networks (e.g., networks of different agencies or groups) and different types of endpoints of different networks) may be bridged together through MCS 56 to provide virtual talk group communications. MCS 56 may include any suitable number or type of conference bridges, ports, digital signal processors or other components to facilitate communications discussed herein.

Policy engine 58 includes policies for undertaking various operations and functionality upon the occurrence of various events to provide dynamic incident management. These policies may include both pre-determined and ad hoc policies. For example, upon the occurrence of a particular incident, the incident may include a unique identifier and may have basic incident attributes such as time of creation, name of user creating and status. A pre-determined policy may then be executed by an incident manager or dispatch personnel as action for the specific incident. In particular embodiments, policy engine may receive inputs from alarms and sensors to setup device agnostic communications interoperability and one-way video and data collaboration and to trigger additional events such as pagers, e-mails, notifications, dial-outs, recording and information escalation.

Authentication and security system 60 manages access, configuration and control privileges for users of IS 50 and those participating in interoperable communications. For example, different users may have different privileges assigned for interoperable communications. Some users may only have transmit or listen privileges with respect to one or more particular talk groups, while other users may have the ability to communicate in all talk groups or setup and configure various talk groups. User privileges may change dynamically upon the occurrence of particular events.

Call manager 62 maintains information regarding various users, such as users of IP networks for which interoperable communications are provided by IS 50. This facilitates in the extension of PTT to IP networks and in the provision of voice and data interoperability across radio and non-radio networks. In particular embodiments, call manager 62 may maintain a listing, table, or other organization of information about users. The information may include a name or other identifier and contact information such as phone numbers and email addresses for the users. In particular embodiments call manager 62 may represent any appropriate combination of hardware, software and/or encoded logic distributed throughout a communication network coupled with IS.

Processor 64 may be a microprocessor, controller, or any other suitable computing device, resource, or combination of hardware, software and/or encoded logic operable to provide, either alone or in conjunction with other IS components such as OMA 54 and its components, IS 50 functionality. Such functionality may include providing various features discussed herein to a user, such as a user of an endpoint accessing IS 50 through OMA 54. Such features may include, as further discussed herein, conveying communicated media to a user in a manner to reflect the position of the media's source relative to the user.

Memory module 66 may be any form of volatile or non-volatile memory including, without limitation, magnetic media, optical media, random access memory (RAM), read-only memory (ROM), removable media, or any other suitable local or remote memory component. Memory module 66 may store any suitable data or information, including software and encoded logic, utilized by IS 50. In particular embodiments, memory module 66 may include data for user management, talk-group management, resource pool management, privileges, backup configuration and information and/or timestamp and activity tracking.

IS 50 may also include any number of switches, routers, firewalls, mobile access routers, access points, wireless bridges and other components in order to accommodate particular operational desires and needs.

In particular embodiments such as in the LMR network interoperability context, IS 50 may, through one or more components discussed above or through other components, encode received audio with a standard audio codec, such as G.711 or G.729. Those audio samples may be packaged in standards-based real-time transport protocol (RTP) packets suitable for transport on an IP network. At this point, the communication element may be abstracted from the distinctive characteristics of each radio system. These audio packets can be sent across the network to other radio systems either individually (unicast) or as a group (multicast). The recipient of the audio packets may be a device capable of receiving and decoding the RTP stream, such as an IP telephone or PC with appropriate software. The IP network and IP-enabled devices can be used to allow users to monitor or transmit on a particular radio channel from a desk without issuing another radio.

As indicated above, IS 50 may facilitate communication among users of endpoints of various networks through virtual channels or talk groups. For example, a channel may comprise a unidirectional or bidirectional path for transmitting and/or receiving electrical or electromagnetic signals. This may comprise, for example, a conventional radio physical RF channel. A talk group in this context may be a subgroup of users (e.g., radio users) who share a common functional responsibility and typically coordinate actions amongst themselves without radio interface with other subgroups. For example, a municipality's police department network may include various talk groups.

A virtual talk group (VTG) represents interoperability of a group of channels, for example, as an audio conference or meeting. A virtual talk group may include an associated virtual channel and an ID. Virtual channels may comprise an address, such as an IP address, associated with a virtual talk group through which users may access the virtual talk group and/or through which communications from VTG member-endpoints are bridged. Various types of virtual talk groups may be utilized in particular embodiments, such as a multicast address usable by all endpoints of the VTG, a VTG comprising multiple talk groups (e.g., multiple radio sources from different frequencies whose communications are mixed), a unicast group and a combination unicast and multicast group.

As an example, a particular virtual talk group may comprise a conference or meeting of the following: (1) a channel or other multicast path used by certain users of a police department's radio network, (2) a channel or other multicast path used by certain users of a fire department's radio network, (3) a channel or other multicast path used by certain users of a corporation's security radio network and (4) a plurality of users of IP-enabled endpoints such as IP phones, IP-enabled PDAs or PCs. An operator of IS 50 may configure the virtual talk group using any suitable interface, such as by dragging and dropping the included channels and IP endpoints into a single area representing the virtual talk group. MCS 56 may provide the functionality for the conference of the virtual talk group members. In particular embodiments, multiple talk groups may be patched together on a dynamic, as needed basis. In some cases a virtual talk group may not necessarily include communications through an IS but may instead include member endpoints whose communications are mapped to IP addresses at gateways (such as LMR gateways) controlled by an IS.

Any number of virtual talk groups may be configured to provide any suitable audio, data, video and control network interoperability. Virtual talk groups may be created using any suitable user/endpoint groups or channels based on location, organizational requirements, event requirements or any other suitable characteristic. An administrator or operator may configure channel details such as name, description, participants, multicast IP addresses, codec and latch options through, for example, OMA 54.

In the illustrated embodiment, OMA 54 also includes media position module (MPM) 68. MPM 68 utilizes both location information (e.g., through GPS or other information) identifying the position of an endpoint transmitting media and the position of a communication recipient (e.g., a user of endpoint 70) relative to the position of the transmitting endpoint to calculate a real voice arrival direction and distance of the speaker from the recipient. The volume of communicated media and its attenuation ratio which determines the perceived direction of the speaker may be altered based on the location of the transmitting endpoint and its distance from a recipient. Thus, the relative volume of different media streams within any specific channel may be altered to convey relative position information of the sources of the media streams. For example, team members who are closer to the listener may be rendered louder than remote speakers. In addition, the relative direction of the transmitted media can be conveyed through the speakers used by the listener. As the listener changes his orientation, the perceived direction of the speaker may change accordingly to reflect the true location of the talker relative to the listener. Thus, MPM 68 may also monitor the orientation of the user of endpoint 70 to provide its functionality. MPM 68 may be centrally located in an IS or otherwise distributed in one or more network components. For example, endpoints may include an MPM to provide functionality as further discussed below.

Media communicated throughout communication system 10 may include GPS information identifying a transmitting mobile endpoint's location such that the mobile endpoint's location can be conveyed to the one or more other endpoints in connection with the communicated audio, video or other information. Endpoint location information may be transmitted with endpoint communications in any suitable manner, such as through GPRS or steganographically. In particular cases, the communications from mobile endpoints comprise multicast communications that are transmitted to other endpoints of the same network and to IS 50 for transmission to endpoints of other networks. In some embodiments, location information and other meta information, such as unit ID, priority and channel, may be communicated using a separate associated multicast port/channel.

In some cases, location information may be transported in a real-time transport protocol (RTP) header extension. For example, RTP headers include a reserved area in the header to put a variable length header extension that could contain additional information about an RTP talker. As another example, location information may be transported using the real-time control protocol (RTCP) stream. The RTCP port is one higher than the RTP port by definition. In particular cases, other attributes about the endpoint may already be included using RTCP. The location information may comprise, for example, GPS latitude/longitude information or street and/or city information. In some embodiments, the associated RTP stream may include the location information. As an example, 239.1.1.1:21111 might be a RTP multicast address:port through which the voice stream is transported, and another address:port (for example, the RTP VoIP port+2 for the RTP signaling port) may be used to include the location information.

In particular embodiments, the location information may be communicated to all original streams, such as via multipoint conference system 56 of IS 50 or directly between the endpoints without traversing through the IS. For example, GPS1, GPS2 and GPS3 may comprise GPS information from three separate endpoints involved in a talk group. In the case of the appended RTP header example, the multipoint conference system may combine and/or append the meta data components at the point of the mixing or bridging function. In the case of the separate control channel example, the streams may flow to all application aware endpoints, and an endpoint may recognize and determine the interesting or relevant GPS information from multiple meta streams. In the case of the RTCP model example, RTCP streams may be typically collected and terminated at each endpoint. Multipoint conference system 56 may terminate the RTCP meta information and regenerate an associated RTCP stream on the other side for transmission to endpoints. In some cases, either the RTP header extension or a new payload type may be used. In particular cases, a description field may be used. In a situation where MCS 56 mixes more than one media stream, the location description field may include the locations of a plurality of speaking endpoints. The RTP header may be sent for every packet and may be large overhead but may be best for real time changing information. The particular data, application and operational requirements and desires may dictate the best methodology for transmission of the location information.

Figure 3:
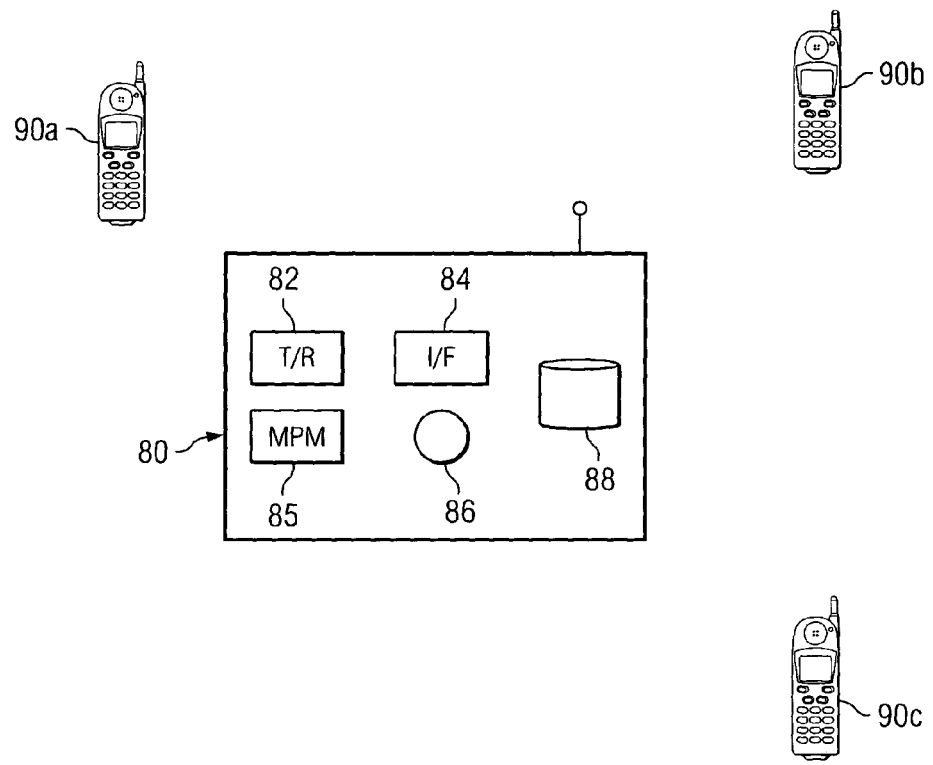
FIG. 3 illustrates a plurality of endpoints capable of conveying media source location information, in accordance with a particular embodiment.

In some embodiments, location information may not be transmitted in connection with transmitted media, but a network component such as IS 50 may monitor locations of transmitting endpoints. Other methods may also be used to determine a location of a transmitting endpoint, such as RFID technology, triangulation (e.g., to in-building wireless antennas), accelerometers (e.g., for calculating position corrections from a last known position) and mesh wireless technologies (e.g., based on neighbors and signal strength measurements as indicated by, for example, received signal strength indication (RSSI)). Some embodiments may use any suitable combination of location technologies. In this way, the IS 50 may still convey the location of a transmitting endpoint to a recipient when media from such endpoint is presented to the recipient. MPM 68 uses location information to present, in connection with processor 64, media to a user of endpoint 70 in a manner to reflect the real arrival direction and distance of the media based on the positions of the transmitting endpoint and the user. As indicated above and further discussed below, in some embodiments endpoints may include an MPM to determine a position of a sender of media relative to a recipient of the media and determine the appropriate manner to present the media to convey the relative position information. FIG. 3 illustrates a plurality of endpoints 80 and 90a-90c, in accordance with a particular embodiment. Endpoints 80 and 90a-90c may comprise mobile endpoints and may be similar to, and may provide similar functionality to, other endpoints discussed herein. Endpoints 80 and 90a-90c may communicate with each other (e.g., audio, video or other data communications) using one or more communication networks and components such as those described above with respect to communication system 10 of FIG. 1. In some cases, endpoints 80 and 90a-90c may be of the same communication network, such as a PTT mobile radio network communicating on a particular frequency. However, in some embodiments endpoints 80 and 90a-90c may be part of different communication networks and may communicate interoperably. For example, endpoints 80 and 90a-90c may be a part of different radio networks of different public or private agencies or groups. The endpoints' interoperable communications may be facilitated by an interoperability system such as those described herein.

In the illustrated embodiment, endpoint 80 includes a transmitter/receiver 82, a user interface 84, a MPM 85, a processor 86 and a memory module 88. Transmitter/receiver 82 obtains signals from GPS satellites or ground stations of a communication network in order to determine the position (e.g., including orientation) of endpoint 80 and also receives and transmits communications such as audio, video and other data to and from other network components. Transmitter/receiver 82 may also be referred to as an interface. User interface 84 provides a mechanism through which a user of endpoint 80 may operate the endpoint and communicate with other network devices. Interface 84 may comprise a keypad, display, touch screen, audio input and output or any other suitable interface. Interface 84 may also include a stereo headset or other output for presenting media to the user of endpoint 80. Instructions for endpoint 80 may be submitted through speech recognition, collection of keystrokes, soft key or otherwise.

Processor 86 may be a microprocessor, controller, or any other suitable computing device, resource, or combination of hardware, software and/or encoded logic operable to perform endpoint functionality. Processor 86, either alone or in conjunction with other endpoint components, provides endpoint functionality discussed herein. Memory module 88 may be any form of volatile or non-volatile memory including, without limitation, magnetic media, optical media, random access memory (RAM), read-only memory (ROM), removable media, or any other suitable local or remote memory component.

In particular embodiments, communications from endpoints such as endpoints 80 and 90a-90c may include GPS or other information indicating the location of the endpoint from which a particular communication is transmitted. The GPS or other location information may be carried by both unicast and multicast communications and, in addition, may be derived locally by a particular endpoint.

MPM 85 may comprise any suitable hardware, software or encoded logic and may provide similar functionality as MPM 68 of IS 50 described above. For example, MPM 85 may take communications received from endpoints 90a-90c and present such communications to a user of endpoint 80 in a manner to indicate the respective location of the communications transmitting endpoints. For example, assuming a user of endpoint 80 is oriented in the manner in which endpoint 80 is depicted, communications originating from endpoint 90a may be presented to the user as arriving from the user's left-front side. Similarly, communications originating from endpoint 90b may be presented to the user as arriving from the user's right-front side and may be presented at a lower volume relative to communications from endpoint 90a to reflect that endpoint 90b is further away than endpoint 90a. MPM 85 may determine the locations of transmitting endpoints 90a-90c in any particular manner, such as by analyzing location information embedded in media transmitted from the endpoints or by obtaining the location information from other network components or devices. In addition, MPM 85 may determine the orientation (or direction that the user of endpoint 80 is facing) in any suitable manner, if such information is applicable in a particular embodiment. For example, endpoint 80 may be used in a vehicle, and the current direction of the vehicle may be used to determine the user's orientation. In some cases, the orientation of a user may be derived in the headset of the user (e.g., using any suitable technology) and communicated to the applicable MPM. In some cases, such as in the case of a stationary dispatch personnel, the user's orientation may be static and may not be used in the process of conveying the location information through the presentation of transmitted communications.

Figure 4A:
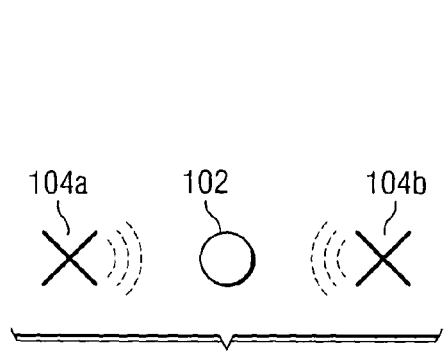
FIGS. 4A and 4B illustrate example speaker configurations that may be used in particular embodiments.
Figure 4B:
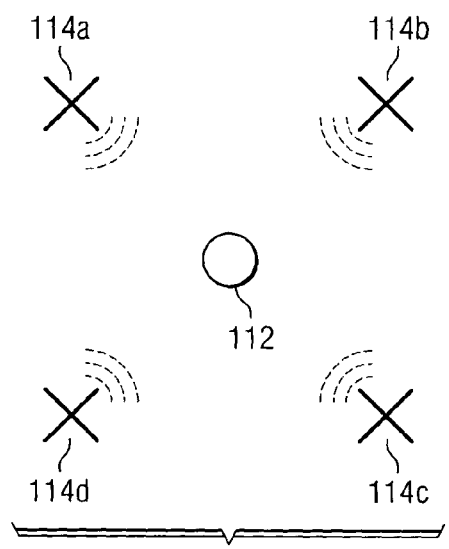

FIGS. 4A and 4B illustrate example speaker configurations that may be used in particular embodiments. FIG. 4A includes listener 102 and two speakers 104a and 104b. In this case, for example, media originating from an endpoint that is directly to the listener's left may be presented using speaker 104*a* (while speaker 104*b* is mute), and media originating from an endpoint that is directly to the listener's right may be presented using speaker 104*b* (while speaker 104*a* is mute). Media coming from an endpoint at another location relative to listener 102 may be presented using speakers 104 to convey the endpoint's location using any suitable presentation method.

FIG. 4B includes listener 112 and four speakers 114*a*, 114*b*, 114*c* and 114*d*. Speakers 114 may be used together to present media in a manner to reflect the location of the media's source relative to listener 112. For example, media originating from an endpoint that is directly in front of the listener may be presented using speakers 114*a* and 114 equally.

As indicated herein, media may be presented in any suitable manner using speakers positioned or oriented in any particular manner in order to convey the location of the media's source. For example, other embodiments may include the same number or a different number of speakers positioned in the same or in a different manner than embodiments specifically illustrated herein. In addition, various methods may be used to convey the distance of media's source relative to a listener, such as volume adjustment.

In particular embodiments the manner in which communications are presented to listeners may change based not only on the location of the listener but also on the listener's orientation. For example, communications presented while the listener is facing northward may be presented in an opposite manner (from a location standpoint) if the listener turns to face south. This feature may be useful, for example, if the speakers used to present the media in a manner to convey the relative location of the media's source are in a headset. This feature may also be useful if the listener is in a mobile vehicle. In this case, the direction/orientation of the vehicle may be utilized to determine the relative location of the media's source. Any suitable methods or technologies may be used to determine the direction/orientation of a listener and/or endpoint in order to determine the manner in which communicated media should be presented to convey the location of the media's source. In some cases, speakers used in particular embodiments may be static or attached to the headset of the user. When the speakers are static, embodiments may calculate the orientation of the, for example, vehicle in which the end-user drives and in which the speakers are mounted. When speakers are located in the headset, the system may calculate the orientation of the head of the end-user in order to present to him the true voice arrival direction.

In some embodiments, a user receiving communications may use his endpoint's interface to override a volume setting of one or more specific speakers and may manually alter the volume of one or more specific channels. In addition, some embodiments may provide the ability for users to fix the relative direction of a specific channel at any desired direction such that the true orientation of the speaker relative to the listener is not reflected when the media is communicated to the listener.

The aforementioned embodiments with manual configuration may be used, for example, whenever the received media stream does not carry GPS or other location information. Thus, the listener may configure his endpoint, an IS or other component, device or system presenting media to reflect relative source location such that the media is presented as if coming from a particular direction (e.g., the far left direction). In some cases, a distinct signal, such as a beep, may be mixed with media that does not carry GPS or other location information to alert the listener that the direction of the speaker does not represent the real arrival direction of the media.

As indicated above, particular embodiments work not only with PTT audio communications but also with other forms of media, such as IM, video and other forms of audio communications. For example, IM or other communications transmitted through a communication system such as communication system 10 may carry GPS or other location information that indicates a position of the sender. This information may be utilized to identify for a recipient the relative location of the sender through, for example, one or more distinctive beeps to the recipient from the real arrival direction of the IM sender. The volume and/or number of beeps may be altered to indicate distance from the recipient to the sender. Other methods and/or signals may also be used to convey the relative location (e.g., direction and/or distance) of an IM or other media sender upon presentation of the media. In some embodiments, a communicated IM message may be converted to a voice message which is played to a recipient to convey the relative arrival direction of the IM message. For example, using text to speech (TTS) technology, a network component may convert a communicated text or other IM message to an audio communication to be presented to a recipient in a manner to reflect a relative position of a transmitting endpoint as discussed herein with respect to various embodiments. Such conversion may be made by an MPM or any other suitable network component.

FIG. 5 illustrates a method for conveying media source location information, in accordance with a particular embodiment. The method begins at step 200 wherein a first communication is received from a first endpoint. The first communication may include an audio communication, such as a PTT communication, or any other audio, video or data communication (e.g., including IM or e-mail). At step 202, location information indicating a first location of the first endpoint is received. The location information may comprise GPS information and may be received in conjunction with the first communication. In some embodiments, the location information may be steganographically embedded in the first communication. The first communication and the location information may be received at an interface of a second endpoint or at an interface of another component, such as an interoperability system providing interoperable communications between endpoints of different communication networks.

At step 204, the first communication is presented to a user of a second endpoint from a direction relative to the user that corresponds to a direction of the first location of the first endpoint relative to a second location of the second endpoint. For example, if the first endpoint is west of the second endpoint, then the first communication may be presented through the left ear of the user of the second endpoint. Such presentation may be made by attenuating the output of one or more audio speakers used to present communications to the user. In some cases, the orientation of the user of the second endpoint (e.g., the direction that the user is facing) may be taken into account when presenting the first communication from its arrival direction relative to the user or the second endpoint.

At step 206, the first communication may be presented to the user of the second endpoint in a manner to reflect the distance between the first location of the first endpoint and the second location of the second endpoint. For example, communications may be presented at a higher volume level when the first and second endpoint's are closer together in order to reflect the shorter distance between them.

Thus, steps 204 and 206 illustrate the presentation of the first communication to the user of the second endpoint in a manner to reflect the first location of the first endpoint relative to the second location of the second endpoint. The orientation of the user of the second endpoint may also be taken into account in such presentation of the first communication. These steps may be performed by any suitable processor (such as by a mobile positioning module) of a network component. In some cases such processor and functionality may reside in the second endpoint. In some embodiments such processor and functionality may be provided by an interoperability system that facilitates the presentation of the communications to the second endpoint (e.g., coupled to the interoperability system through a communication network). This may be the case, for example, when the first and second endpoints comprise endpoints of different communication networks and/or endpoints communicating on different frequencies. As indicated above, embodiments also provide for presentation of communications to reflect arrival location of text communications, such as SMS text messages, IM and e-mail.

Some of the steps illustrated in FIG. 5 may be combined, modified or deleted where appropriate, and additional steps may also be added to the flowchart. Additionally, steps may be performed in any suitable order without departing from the scope of the invention.

Thus, technical advantages of particular embodiments include the ability to render a communication stream, such as a voice stream, to an end user from the real direction of the speaker relative to the end user. Particular embodiments also provide the listener with an indication about the distance of the speaker from the listener by, for example, altering the volume of the rendered audio. Media streams carrying location information to facilitate the conveyance of relative locations of transmitting endpoints may be integrated with those that do not have associated location information. For example, a distinct audible tone may be provided to mark media streams for which the direction of arrival is unknown. In particular embodiments, a user may override the real arrival direction of the media to enable any channel or individual media to be presented from a preferred desired direction and/or at a preferred volume. Particular embodiments also provide the real arrival direction of IM messages and other text communications by rendering a distinct beep or other signal to the end user. The distinct beep or other signal is perceived to arrive from the real direction of the sender.

While various implementations and features are discussed with respect to multiple embodiments, it should be understood that such implementations and features may be combined in various embodiments.

Although the present invention has been described in detail with reference to particular embodiments, it should be understood that various other changes, substitutions, and alterations may be made hereto without departing from the spirit and scope of the present invention. For example, although the present invention has been described with reference to a number of elements included within communication system 10 and illustrated endpoints and interoperability systems, these elements may be combined, rearranged or positioned in order to accommodate particular routing architectures or needs. In addition, any of these elements may be provided as separate external components to communication system 10 and illustrated endpoints and interoperability systems, or each other where appropriate. The present invention contemplates great flexibility in the arrangement of these elements as well as their internal components.

Numerous other changes, substitutions, variations, alterations and modifications may be ascertained by those skilled in the art and it is intended that the present invention encompass all such changes, substitutions, variations, alterations and modifications as falling within the spirit and scope of the appended claims.

What is claimed is:

1. A method for conveying media source location information, comprising:
   receiving a first communication from a first endpoint;
   receiving location information indicating a first location of the first endpoint;
   presenting the first communication to a user of a second endpoint in a manner to reflect the first location relative to a second location of the second endpoint; and
   wherein presenting the first communication to a user of a second endpoint in a manner to reflect the first location relative to a second location of the second endpoint comprises presenting the first communication to the user in a manner to reflect a distance between the first location and the second location;
   wherein the first location of the first endpoint is a first distance from the second location of the second endpoint and wherein the first communication is presented at a first volume level;
   further comprising:
      receiving a second communication from a third endpoint;
      receiving location information indicating a third location of the third endpoint, the third location a second distance from the second location of the second endpoint, the second distance greater than the first distance; and
      presenting the second communication to the user of the second endpoint in a manner to reflect the third location relative to the second location of the second endpoint; and
   wherein the second communication is presented at a second volume level that is less than the first volume level.

2. The method of claim 1, wherein presenting the first communication to a user of a second endpoint in a manner to reflect the first location relative to a second location of the second endpoint comprises presenting the first communication to the user from a direction relative to the user corresponding to a direction of the first location relative to the second location.

3. The method of claim 2:
   further comprising receiving orientation information indicating an orientation of the user; and
   wherein presenting the first communication to the user from a direction relative to the user corresponding to a direction of the first location relative to the second location comprises presenting the first communication to the user from a direction relative to the orientation of the user corresponding to a direction of the first location relative to the second location.

4. The method of claim 1, wherein presenting the first communication to a user of a second endpoint in a manner to reflect the first location relative to a second location of the second endpoint comprises attenuating an output signal of at least one speaker of a plurality of speakers used to present the first communication to the user of the second endpoint.

5. The method of claim 1, wherein receiving location information indicating a first location of the first endpoint comprises receiving global positioning satellite (GPS) information indicating the first location of the first endpoint.

6. The method of claim 1, wherein:
   the first communication comprises an audio message; and
   the location information is steganographically embedded within the audio message.

7. The method of claim 1, further comprising:
   receiving a third communication from a fourth endpoint; and
   presenting the third communication to the user of the second endpoint in a manner to reflect that a location of the fourth endpoint is unknown.

8. The method of claim 1, wherein:
the first communication comprises a text communication; and
presenting the first communication to the user of the second endpoint in a manner to reflect the first location relative to the second location of the second endpoint comprises:
  presenting the text communication to the user of the second endpoint; and
  communicating an audio signal to the user of the second endpoint in a manner to reflect the first location relative to the second location of the second endpoint.

9. The method of claim 1, wherein:
the first communication comprises a text communication; and
presenting the first communication to the user of the second endpoint in a manner to reflect the first location relative to the second location of the second endpoint comprises presenting the first communication to the user of the second endpoint as an audio message using text to speech (TTS) in a manner to reflect the first location relative to the second location of the second endpoint.

10. The method of claim 1, wherein:
the first endpoint comprises a push-to-talk endpoint; and
the first communication comprises a push-to-talk communication.

11. The method of claim 1, wherein the first and second communications are audio communications presented audibly.

12. A system for conveying media source location information, comprising:
an interface operable to:
  receive a first communication from a first endpoint; and
  receive location information indicating a first location of the first endpoint;
a processor coupled to the interface and operable to present the first communication to a user of a second endpoint in a manner to reflect the first location relative to a second location of the second endpoint; and
wherein a processor operable to present the first communication to a user of a second endpoint in a manner to reflect the first location relative to a second location of the second endpoint comprises a processor operable to present the first communication to the user in a manner to reflect a distance between the first location and the second location;
the first location of the first endpoint is a first distance from the second location of the second endpoint and wherein the first communication is presented at a first volume level;
the interface is further operable to:
  receive a second communication from a third endpoint; and
  receive location information indicating a third location of the third endpoint, the third location a second distance from the second location of the second endpoint, the second distance greater than the first distance; and
the processor is operable to present the second communication to the user of the second endpoint in a manner to reflect the third location relative to the second location of the second endpoint; and
the second communication is presented at a second volume level that is less than the first volume level.

13. The system of claim 12, wherein a processor operable to present the first communication to a user of a second endpoint in a manner to reflect the first location relative to a second location of the second endpoint comprises a processor operable to present the first communication to the user from a direction relative to the user corresponding to a direction of the first location relative to the second location.

14. The system of claim 13, wherein:
the interface is further operable to receive orientation information indicating an orientation of the user; and
a processor operable to present the first communication to the user from a direction relative to the user corresponding to a direction of the first location relative to the second location comprises a processor operable to present the first communication to the user from a direction relative to the orientation of the user corresponding to a direction of the first location relative to the second location.

15. The system of claim 12, wherein a processor operable to present the first communication to a user of a second endpoint in a manner to reflect the first location relative to a second location of the second endpoint comprises a processor operable to attenuate an output signal of at least one speaker of a plurality of speakers used to present the first communication to the user of the second endpoint.

16. The system of claim 12, wherein an interface operable to receive location information indicating a first location of the first endpoint comprises an interface operable to receive global positioning satellite (GPS) information indicating the first location of the first endpoint.

17. The system of claim 12, wherein:
the first communication comprises an audio message; and
the location information is steganographically embedded within the audio message.

18. The system of claim 12, wherein:
the interface is further operable to receive a third communication from a fourth endpoint; and
the processor is further operable to present the third communication to the user of the second endpoint in a manner to reflect that a location of the fourth endpoint is unknown.

19. The system of claim 12, wherein:
the first communication comprises a text communication; and
a processor operable to present the first communication to the user of the second endpoint in a manner to reflect the first location relative to the second location of the second endpoint comprises a processor operable to:
  present the text communication to the user of the second endpoint; and
  communicate an audio signal to the user of the second endpoint in a manner to reflect the first location relative to the second location of the second endpoint.

20. The system of claim 12, wherein:
the first communication comprises a text communication; and
a processor operable to present the first communication to the user of the second endpoint in a manner to reflect the first location relative to the second location of the second endpoint comprises a processor operable to present the first communication to the user of the second endpoint as an audio message using text to speech (TTS) in a manner to reflect the first location relative to the second location of the second endpoint.

21. The system of claim 12, wherein:
the first endpoint comprises a push-to-talk endpoint; and
the first communication comprises a push-to-talk communication.

22. A system for conveying media source location information, comprising:
means for receiving a first communication from a first endpoint;

means for receiving location information indicating a first location of the first endpoint;

means for presenting the first communication to a user of a second endpoint in a manner to reflect the first location relative to a second location of the second endpoint;

wherein means for presenting the first communication to a user of a second endpoint in a manner to reflect the first location relative to a second location of the second endpoint comprises means for presenting the first communication and the second communication to the user in a manner to reflect a distance between the first location of the first endpoint and the second location of the second endpoint;

wherein the first location of the first endpoint is a first distance from the second location of the second endpoint and wherein the first communication is presented at a first volume level;

further comprising:
means for receiving a second communication from a third endpoint;
means for receiving location information indicating a third location of the third endpoint, the third location a second distance from the second location of the second endpoint, the second distance greater than the first distance; and
means for presenting the second communication to the user of the second endpoint in a manner to reflect the third location relative to the second location of the second endpoint; and wherein the second communication is presented at a second volume level that is less than the first volume level.

23. Logic embodied in a non-transitory computer readable medium, the non-transitory computer readable medium comprising code that, when executed by a processor, is operable to:

receive a first communication from a first endpoint;
receive location information indicating a first location of the first endpoint;
present the first communication to a user of a second endpoint in a manner to reflect the first location relative to a second location of the second endpoint; and
wherein code operable to present the first communication to a user of a second endpoint in a manner to reflect the first location relative to a second location of the second endpoint comprises code operable to present the first communication to the user in a manner to reflect a distance between the first location and the second location;
the first location of the first endpoint is a first distance from the second location of the second endpoint and wherein the first communication is presented at a first volume level;
the code is further operable to:
receive a second communication from a third endpoint;
receive location information indicating a third location of the third endpoint, the third location a second distance from the second location of the second endpoint, the second distance greater than the first distance; and
present the second communication to the user of the second endpoint in a manner to reflect the third location relative to the second location of the second endpoint; and
the second communication is presented at a second volume level that is less than the first volume level.

24. The medium of claim 23, wherein code operable to present the first communication to a user of a second endpoint in a manner to reflect the first location relative to a second location of the second endpoint comprises code operable to present the first communication to the user from a direction relative to the user corresponding to a direction of the first location relative to the second location.

25. The medium of claim 24, wherein:
the code is further operable to receive orientation information indicating an orientation of the user; and
wherein code operable to present the first communication to the user from a direction relative to the user corresponding to a direction of the first location relative to the second location comprises code operable to present the first communication to the user from a direction relative to the orientation of the user corresponding to a direction of the first location relative to the second location.

26. The medium of claim 23, wherein code operable to present the first communication to a user of a second endpoint in a manner to reflect the first location relative to a second location of the second endpoint comprises code operable to attenuate an output signal of at least one speaker of a plurality of speakers used to present the first communication to the user of the second endpoint.

27. The medium of claim 23, wherein code operable to receive location information indicating a first location of the first endpoint comprises code operable to receive global positioning satellite (GPS) information indicating the first location of the first endpoint.

28. The medium of claim 23, wherein:
the first communication comprises an audio message; and
the location information is steganographically embedded within the audio message.

29. The medium of claim 23, wherein the code is further operable to:
receive a third communication from a fourth endpoint; and
present the third communication to the user of the second endpoint in a manner to reflect that a location of the fourth endpoint is unknown.

30. The medium of claim 23, wherein:
the first communication comprises a text communication; and
code operable to present the first communication to the user of the second endpoint in a manner to reflect the first location relative to the second location of the second endpoint comprises code operable to:
present the text communication to the user of the second endpoint; and
communicate an audio signal to the user of the second endpoint in a manner to reflect the first location relative to the second location of the second endpoint.

31. The medium of claim 23, wherein:
the first communication comprises a text communication; and
code operable to present the first communication to the user of the second endpoint in a manner to reflect the first location relative to the second location of the second endpoint comprises code operable to present the first communication to the user of the second endpoint as an audio message using text to speech (TTS) in a manner to reflect the first location relative to the second location of the second endpoint.

32. The medium of claim 23, wherein:
the first endpoint comprises a push-to-talk endpoint; and
the first communication comprises a push-to-talk communication.

* * * * *